(12) United States Patent
Su et al.

(10) Patent No.: US 6,756,888 B2
(45) Date of Patent: Jun. 29, 2004

(54) CONTROL DEVICE AND METHOD FOR AUTOMATICALLY ADJUSTING VIEW ANGLE OF REARVIEW MIRROR IN RESPONSE TO OUTPUT OF NAVIGATION SYSTEM

(75) Inventors: Wen-Wei Su, Taoyuan (TW); Kuei-Hung Chen, Taoyuan (TW); Shun-Hsiang Hsiao, Taoyuan (TW)

(73) Assignee: Exon Science Inc., Taoyuan (TW)

( * ) Notice: Subject to any disclaimer, the term of this patent is extended or adjusted under 35 U.S.C. 154(b) by 140 days.

(21) Appl. No.: 10/047,762

(22) Filed: Jan. 15, 2002

(65) Prior Publication Data

US 2003/0043479 A1 Mar. 6, 2003

Related U.S. Application Data (63) Continuation-in-part of application No. 09/946,094, filed on Sep. 4, 2001.

(51) Int. Cl.⁷ .................................................. B60Q 1/00
(52) U.S. Cl. ...................... 340/436; 340/435; 340/903; 348/148; 348/149; 359/843; 359/844; 701/211; 701/213; 701/301
(58) Field of Search ................................ 340/436, 435, 340/901, 903, 904; 348/148, 149; 359/841, 842, 843, 844, 877–879; 701/207, 211, 213, 214, 300, 301

(56) References Cited

U.S. PATENT DOCUMENTS

| 4,318,590 A | * | 3/1982 | Hanley ........................ 359/214 |
| 4,679,158 A |  | 7/1987 | Tate |
| 5,027,200 A | * | 6/1991 | Petrossian et al. .......... 348/118 |
| 5,132,851 A |  | 7/1992 | Bomar et al. |
| 5,306,953 A | * | 4/1994 | Weiner ....................... 307/10.1 |
| 5,708,857 A | * | 1/1998 | Ishibashi ..................... 396/21 |
| 5,719,713 A |  | 2/1998 | Brown |
| 5,835,291 A |  | 11/1998 | Takayama |
| 5,899,956 A | * | 5/1999 | Chan .......................... 701/213 |
| 5,953,168 A |  | 9/1999 | Valentino |
| 6,166,698 A | * | 12/2000 | Turnbull et al. ............ 343/713 |
| 6,175,300 B1 | * | 1/2001 | Kendrick ..................... 340/436 |
| 6,193,380 B1 |  | 2/2001 | Jacobs |
| 6,217,177 B1 |  | 4/2001 | Rost |
| 6,348,858 B2 | * | 2/2002 | Weis et al. .................. 340/436 |
| 6,380,536 B1 |  | 4/2002 | Inoue et al. |
| 6,406,154 B1 | * | 6/2002 | Chen .......................... 359/843 |
| 6,421,081 B1 | * | 7/2002 | Markus ....................... 348/148 |
| 6,465,904 B2 |  | 10/2002 | O'Farrell et al. |
| 6,593,960 B1 | * | 7/2003 | Sugimoto et al. ........... 348/148 |
| 6,672,728 B1 |  | 1/2004 | Su et al. |

FOREIGN PATENT DOCUMENTS

| DE | 10016222 | 3/2000 |
| DE | 10020985 | 4/2000 |
| TW | 388377 | 11/1986 |
| TW | 448875 | 10/1988 |
| TW | 448874 | 11/1988 |
| TW | 465498 | 1/1989 |
| TW | 459673 | 11/1989 |

* cited by examiner

*Primary Examiner*—Nina Tong
(74) *Attorney, Agent, or Firm*—Volpe and Koenig, P.C.

(57) ABSTRACT

A control method for automatically adjusting a view angle of a rearview mirror or a CCD camera of a turning vehicle is disclosed. The method includes steps of receiving an output of a navigation system; determining a turning level of the vehicle according to the output of the navigation system; and triggering the rearview mirror or the CCD camera to move to an extent corresponding to the turning level of the vehicle. A control device for automatically adjusting a view angle of a rearview mirror or a CCD camera of a turning vehicle in response to the output of an electronic compass or a global positioning system (GPS) is also disclosed. The control device includes a microprocessor to receive an output of the electronic compass or GPS, determine a turning level of the vehicle according to the output of the navigation system, and trigger the rearview mirror or CCD camera to move to an extent corresponding to the turning level of the vehicle

19 Claims, 8 Drawing Sheets

CONTROL DEVICE AND METHOD FOR AUTOMATICALLY ADJUSTING VIEW ANGLE OF REARVIEW MIRROR IN RESPONSE TO OUTPUT OF NAVIGATION SYSTEM

CROSS REFERENCE TO RELATED PATENT APPLICATION

This patent application is a continuation-in-part (CIP) of a U.S. patent application Ser. No. 09/946,094 filed Sep. 4, 2001, and now pending. The content of the related patent application is incorporated herein for reference.

FIELD OF THE INVENTION

The present invention relates to a control device of a rearview mirror of a vehicle, and more particular to a control device for automatically adjusting a view angle of a rearview mirror of a turning vehicle. The present invention also relates a control method for automatically adjusting a view angle of a rearview mirror of a turning vehicle in response to an output of a navigation system such as an electronic compass or a global positioning system (GPS).

BACKGROUND OF THE INVENTION

When a driver is seated in a vehicle, he should adjust all of the interior and exterior rearview mirrors according to his need. The rearview mirror can be adjusted manually or automatically by pushing buttons. After the adjustment of rearview mirrors is done, the view angle of each rearview mirror seen by the driver is constant, and it is difficult and also dangerous for the driver to further change the view angles while driving.

Figure 1A:
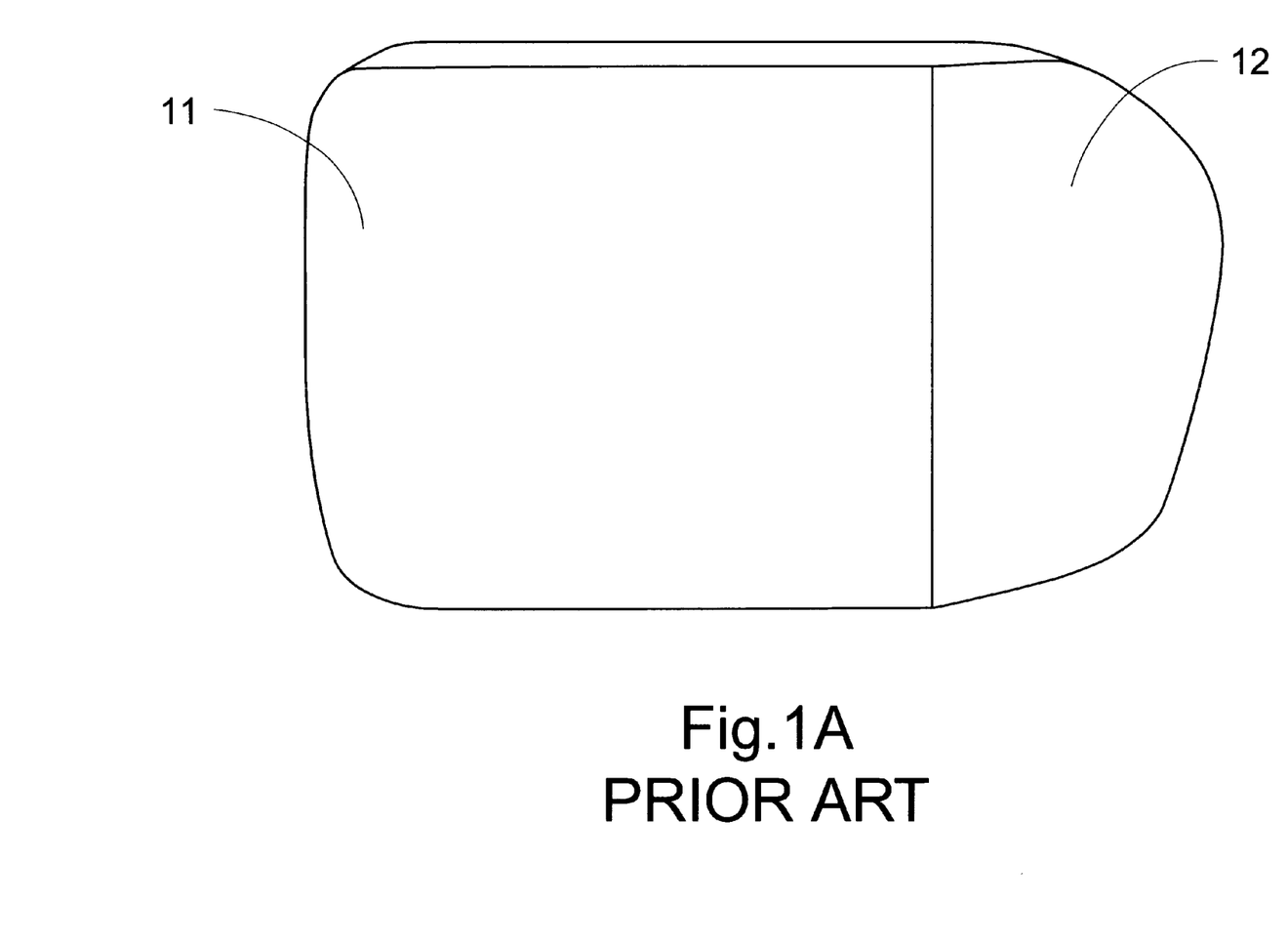
FIG. 1A is a schematic diagram showing a conventional rearview mirror having a relatively large view angle.
Figure 1B:
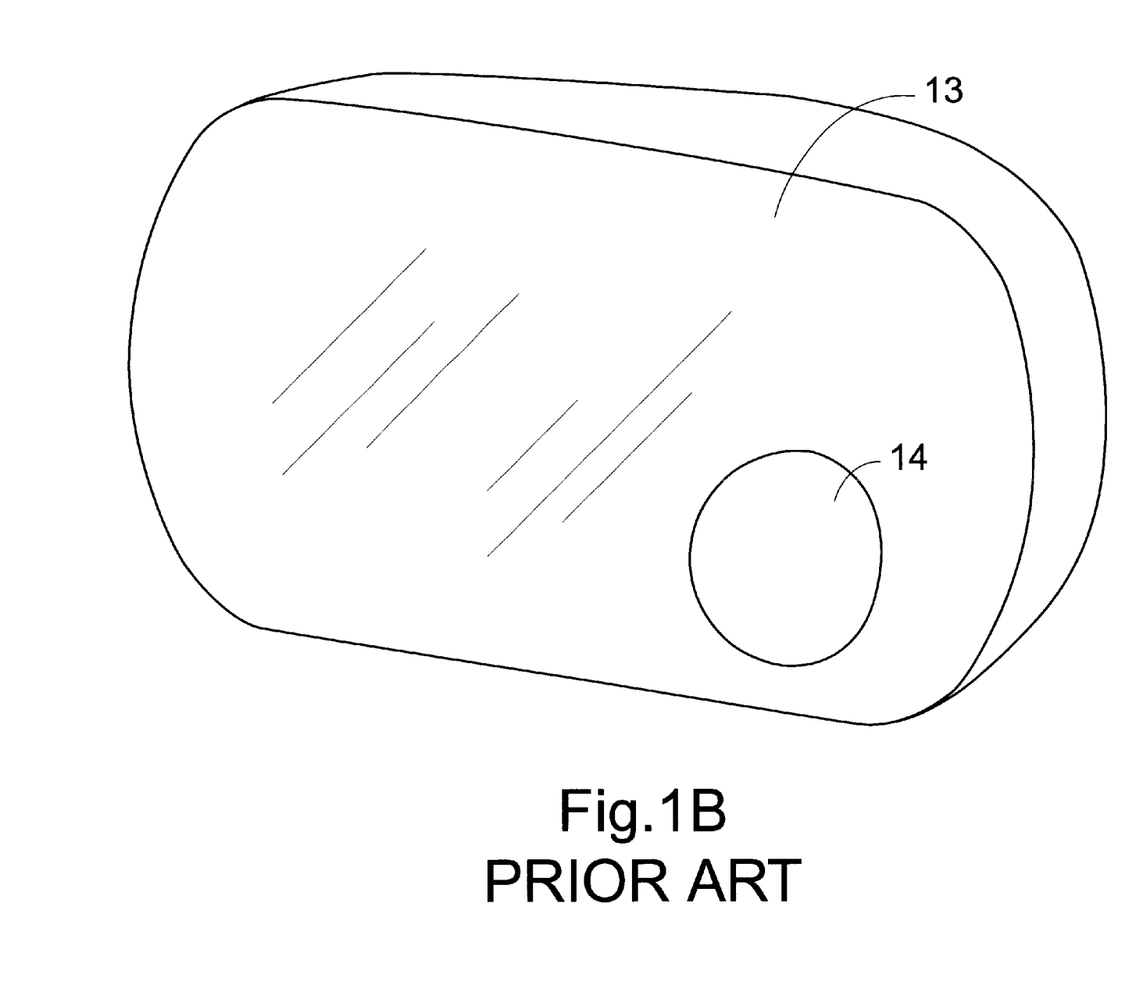
FIG. 1B is a schematic diagram showing another conventional rearview mirror having a relatively large view angle.

In practice, when a driver would like to change to another lane or turn to another direction, he will need to realize more about the situation of the adjacent lane to see whether there is any vehicle oncoming. For a simple plane mirror serving as the exterior rearview mirror, the view angle is not wide enough. Therefore, a mirror consisting of two sections is developed to solve this problem, as shown in FIG. 1. The two sections, for example, may be two plane mirrors 11, 12 deflected from each other (FIG. 1A) by a fixed angle, or one plane mirror 13 and one curved bump 14 (FIG. 1B). This kind of rearview mirror, although improves the view angle to some extent, still has the following disadvantages. First, the manufacturing and assembling processes of the two-sectional mirror are complicated. Further, the outer section of the mirror is generally small, so it is uneasy for the driver to watch it clearly, especially for the mirror at the passenger's side.

In order to solve this problem, it is desired that the view angles of the rearview mirrors can be automatically adjusted in order to avoid any blind spot. For example, when the vehicle is turning right, it is desirable that the driver clearly sees the right lane by rotating the exterior rearview mirror at the right side of the vehicle outwards. Further, it is more preferred that the rotating angle of the rearview mirror depend on the turning angle of the vehicle.

SUMMARY OF THE INVENTION

Therefore, an object of the present invention is to provide a control device and method, which can adjust the view angle of the rearview mirror automatically while the vehicle is turning.

Another object of the present invention is to provide a control device and method, which can adjust the view angle of the rearview mirror dynamically according to the turning angle of the vehicle.

A first aspect of the present invention relates to a control method for automatically adjusting a view angle of a monitoring device of a turning vehicle. The method includes steps of receiving an output of a navigation system; determining a turning operation of the vehicle according to the output of the navigation system; and triggering the monitoring device to move in response to the turning operation of the vehicle. Preferably, the movement of the monitoring device is adjusted dynamically. In other words, it is preferred that the method further includes a step of determining a turning level of the turning operation, and the monitoring device is triggered to move to an extent corresponding to the turning level. The monitoring device, for example, can be an exterior rearview mirror and/or a charge-coupled device (CCD) camera.

When the navigation system is an electronic compass, the turning level of the vehicle can be determined by comparing the output of the electronic compass with a preset value. Therefore, it is preferred that the receiving, comparing and triggering steps are repeated to dynamically adjust a view angle of the rearview mirror of the vehicle.

Preferably, the control method further includes a step of counting a time period to determine the preset value. The time period is accumulatively counted when the turning level is kept to be zero, and the time period is counted over whenever the turning level is determined to be non-zero. In an embodiment, the output of the electronic compass is indicative of one of sixteen direction zones, the preset value is indicative of one of the sixteen direction zones, and the turning level is determined to be zero when the output of the electronic compass and the preset value indicate the same direction zone. The output of the electronic compass replaces for the preset value to serve as a new preset value, and the rearview mirror is triggered to be restored to its initial position when the counted time period exceeds a predetermined value, e.g. 2 seconds.

Preferably, the turning level correlates to an angle between the direction zones indicated by the output of the electronic compass and the preset value.

In another embodiment, the navigation system is a global positioning system (GPS). The turning level correlates to a predetermined turning angle under the guidance of the GPS. The control method further includes a step of triggering the rearview mirror to be restored to its initial position when the GPS indicates the completion of a turning operation by the predetermined turning angle.

A second aspect of the present invention relates to a control device for automatically adjusting a view angle of a monitoring device of a turning vehicle. The control device includes a microprocessor which repetitively receives an output of the navigation system, determines a turning operation of the vehicle according to the output of the navigation system, and triggers the monitoring device to move in response to the turning operation of the vehicle. Preferably, the movement of the monitoring device is adjusted dynamically. In other words, it is preferred that the microprocessor further determines a turning level of the turning operation, and the monitoring device is triggered to move to an extent corresponding to the turning level.

A third aspect of the present invention relates to a control device for automatically adjusting a view angle of a rearview mirror of a turning vehicle in response to the output of a global positioning system (GPS). The control device includes a microprocessor electrically connected to the GPS and a controller area network (CAN) bus. The microprocessor monitors the output of the GPS. When the output of the GPS indicates that the vehicle arrives at a predetermined turning position, the microprocessor sends out a digital encoding signal to a rearview-mirror actuating device via the CAN bus to trigger the rearview-mirror actuating device to rotate the rearview mirror. The rotation of the rearview mirror is preferably dynamically adjusted.

A fourth aspect of the present invention relates to a control device for automatically adjusting a view angle of a rearview mirror of a turning vehicle in response to the output of an electronic compass. The control device includes a microprocessor electrically connected to the electronic compass and a controller area network (CAN) bus. The microprocessor monitors the output of the electronic compass. When the output of the electronic compass indicates that the vehicle is heading a direction different from a preset direction, the microprocessor sends out a digital encoding signal to a rearview-mirror actuating device via the CAN bus to trigger the rearview-mirror actuating device to rotate the rearview mirror. The rotation of the rearview mirror is preferably dynamically adjusted.

Preferably, the control device further includes a timer electrically connected to the microprocessor for counting a time period, wherein the direction that the vehicle is heading replaces for the preset direction to serve as a new preset direction when the counted time period exceeds a predetermined value.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 2:
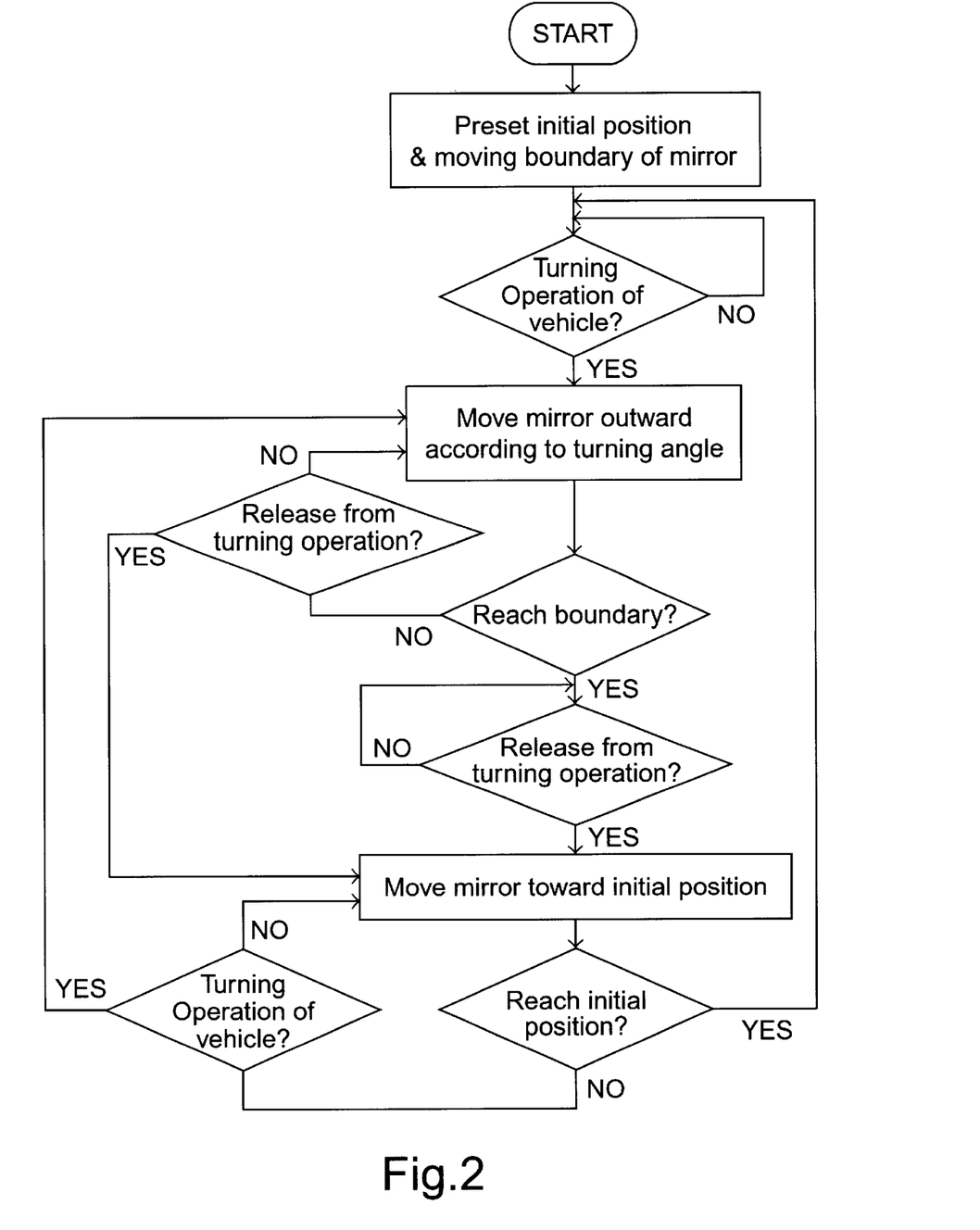
FIG. 2 is a schematic circuit diagram showing a preferred embodiment of a control device according to the present invention.

In order to allow the rearview mirror to be automatically and dynamically adjusted while driving, a method is illustrated herein with reference to a flowchart of FIG. 2 for achieving that purpose. It is to be noted that the automatic view-angle adjusting function can be designed as a basic response of the vehicle. Alternatively, the function can be enabled by pressing a key or a button. It is also understood the flowchart of FIG. 2 is for illustrating one of the rear mirrors, and a similar operation may be applied to the other rearview mirror.

First of all, an initial position of the rearview mirror is preset by adjusting the rearview mirror before driving. While the driver is turning the vehicle right, the turning angle of the vehicle is detected, and the rearview mirror rotates outwards dynamically in response to the turning angle of the vehicle in order to enlarge the view angle of the right side. The outward movement of the rearview mirror is preferably confined within a proper boundary. In other words, when the mirror reaches the moving boundary, the mirror will not rotate further even if the vehicle still turns. On the other hand, no matter if the mirror reaches the moving boundary or not, the mirror moves toward the initial position upon the vehicle returns to the forward direction. Likewise, during the trip of the mirror back to the initial position, no matter if the mirror reaches the initial position or not, the mirror is rotated outward again in response to the turning operation of the vehicle. The turning operation of the vehicle, for example, can be inferred from the output of an electronic compass or a global positioning system (GPS). Embodiments of the control device for executing the present method are illustrated hereinafter.

Figure 3:
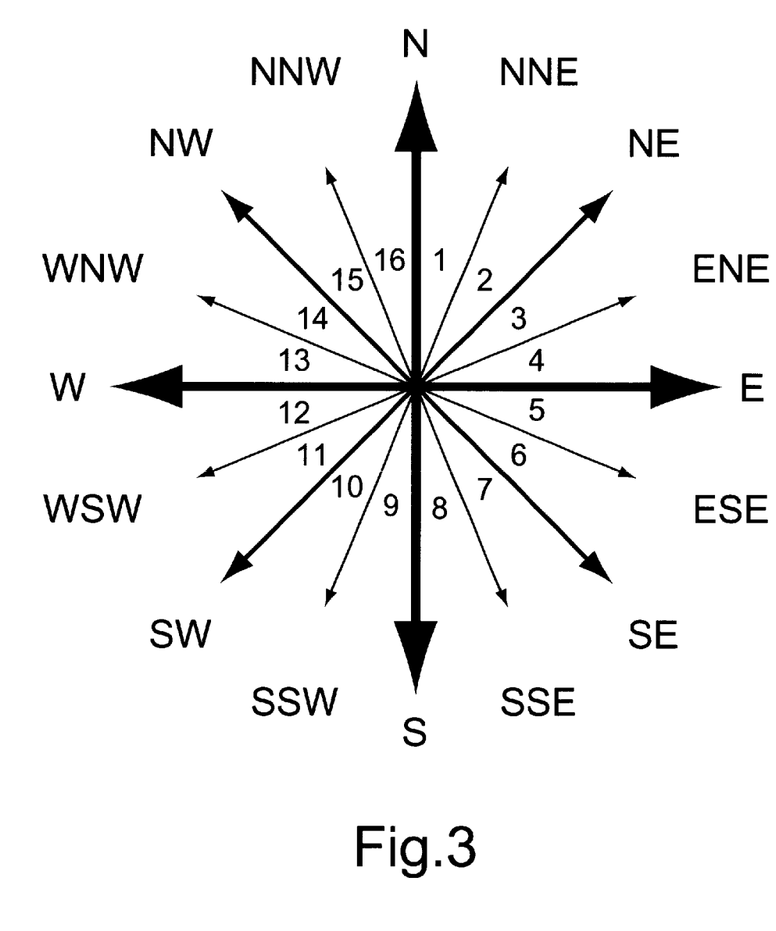
FIG. 3 is a schematic diagram showing a point schedule of an electronic compass to be used with the present invention.

In an embodiment of the present invention, the turning operation of the vehicle is determined by detecting the output of a vehicular electronic compass. As known, an electronic compass works in response to the magnetic field of the earth, thereby identifying the travel direction of the vehicle. The operational principle of the electronic compass is understood by those skilled in the art, and will not be described here. The 360-degree circle the electronic compass is scheduled as a predetermined number of direction zones, e.g. 16 zones 1~16, each of which lies between two of the points N, NNE, NE, ENE, E, ESE, SE, SSE, S, SSW, SW, WSW, W, WNW, NW and NNW, as shown in FIG. 3. When the compass needle crosses a point line between two direction zones, it is determined that the vehicle makes a turn. For example, when the vehicle is heading the direction zone 1 and remains the direction for more than a predetermined time period, e.g. 2 seconds, the direction zone 1 will be set as a reference origin. Afterwards, the vehicle turns right to the direction zone 2. Meanwhile, the rearview mirror at the right side is actuated to rotate outwards to an extent corresponding to the turning operation of one direction zone. If the vehicle further turns right to the direction zone 3, the rearview mirror at the right side will be further rotated outwards to an extent corresponding to the turning operation of two direction zones. Further rotating operation of the rearview mirror will be performed if the vehicle turns to a further direction zone, unless the preset moving boundary is reached. On the other hand, if the vehicle remains in the direction zone 2 for more than the predetermined time period after turning to the direction zone 2, the direction zone 2 will be set as the new reference origin, and the rearview mirror will return to the initial position. Then the turning operation of the vehicle to the direction zone 3 makes the rotation of the rearview mirror reach an extent corresponding to the turning operation across one direction zone. When the vehicle turns left soon from the direction zone 3 to the direction zone 16 through the reference origin, i.e. the direction zone 2, the rearview mirror at the right side will return to the initial position, and then the rearview mirror will rotate outwards to an extent corresponding to a turning operation across two direction zones i.e. 1 and 16. By this way, the view angle of the rearview mirror can be automatically and dynamically adjusted in response to the turning angle of the vehicle.

In the above embodiment, the view angle of the rearview mirror at the left side can be designed to stay unchanged when the rearview mirror at the right side rotates. Alternatively, the rearview mirror at the left side is preferably designed to rotate inwards when the rearview mirror at the right side rotate outwards. In other words, the rearview mirrors at both sides synchronously rotate in the same direction. This is especially advantageous when the vehicle is passing continuous curves. The driver is likely to be unable to see the situation at the right side via the rearview mirror at the right side when the vehicle is turning right. Therefore, the inward movement of the rearview mirror at the left side and the presence of the interior rearview mirror will be helpful for realizing the situation.

Figure 4:
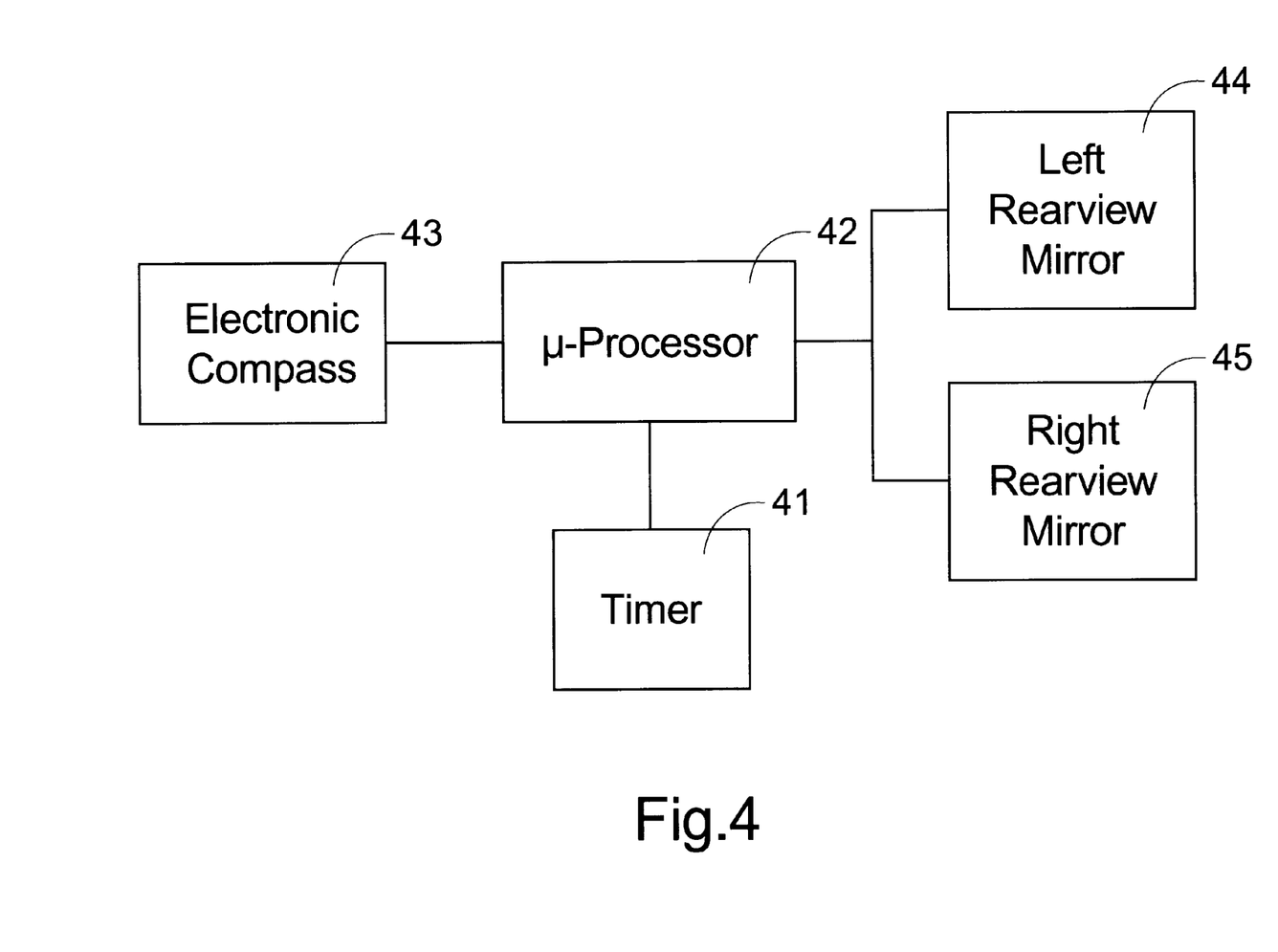
FIG. 4 is a circuit functional block diagram schematically showing a preferred embodiment of the control device for use with an electronic compass according to the present invention.

In order to achieve the purpose of automatically, and preferred dynamically, adjusting the view angle of the rearview mirror in response to a turning operation of the vehicle, as mentioned above, a control device is used to coordinate the rearview mirror and the electronic compass. FIG. 4 is a circuit functional block diagram schematically showing a preferred embodiment of the control device for use with an electronic compass according to the present invention. The control device includes a timer 41 and a microprocessor 42 or an application specific integrated circuit (ASIC). The output of the electronic compass 43 representing a heading direction zone is transmitted to the microprocessor 42 to be compared with a preset value representing an initial direction zone, and the timer 41 starts to count at the same time. When determining a change in direction zones by a first level within a predetermined period, e.g. 2 seconds, the microprocessor 42 outputs a control signal to rotate one or both of the left and right rearview mirrors 44 and 45 to a degree corresponding to the first level of direction change in a manner as mentioned above. It is understood that the timing operation can also be performed by the microprocessor 42 itself in a form of software so as to omit the timer 41. If the heading direction zone of the vehicle keeps unchanged during that predetermined period, the preset value will be replaced by another one representing the heading direction zone, and the counting operation of the timer 41 will start over. Meanwhile, the rearview mirrors are restored to their initial positions. The changing level of the direction zones is now based on the newly set direction zone.

Figure 5:
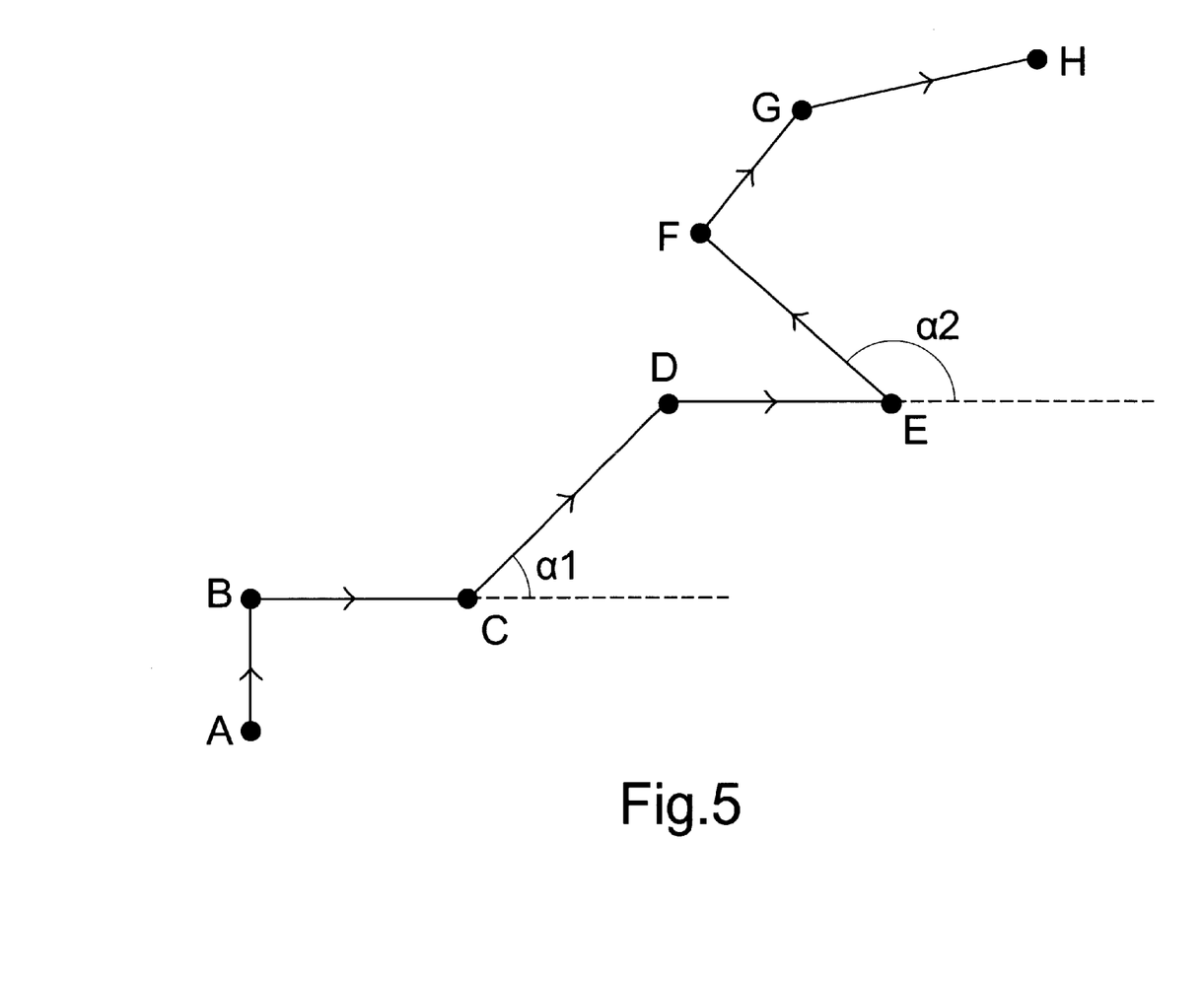
FIG. 5 is a schematic diagram exemplifying a route of the vehicle suggested by the GPS to travel from a start point A to a destination H.

In another embodiment of the present invention, the turning operation of the vehicle is determined by detecting the output of a global positioning system (GPS). As known, the GPS directs the moving path of a vehicle by communicating with different satellites orbiting the earth via radio waves. The operational principle of the GPS is understood by those skilled in the art, and will not be describe herein. Please refer to FIG. 5 which is a schematic diagram exemplifying a route of the vehicle suggested by the GPS to travel from a start point A to a destination H. The route includes a substantially straight line from A to B, a right turn and then a straight line from B to C, a left turn and then a straight line from C to D, a right turn and a straight line from D to E, a left turn and then a straight line from E to F, a right turn and then a straight line from F to G, and another right turn and a straight line from G to H. In other words, it is predetermined that the vehicle will make four right turns and two left turns to reach the destination H, and the GPS acquires the turning operations of the vehicle in advance. Whenever the vehicle gets to a position required to make a right turn by the GPS, i.e. the position B, D, F or G, the rearview mirror at the right side automatically rotates outwards to enlarge the view angle at the right side. Afterwards, when the vehicle enters a straight line after a right turn operation, the rearview mirror will return the initial position. Alternatively, the mirror may be restored to its initial position by counting a predetermined period, e.g. 2 seconds. Likewise, whenever the vehicle gets to a position required to make a left turn by the GPS, i.e. the position C, or E, the rearview mirror at the left side automatically rotates outwards to enlarge the view angle at the left side.

In the above embodiment, it is to be noted that although the vehicle turns left at both of the positions C and E, the turning angles at the two positions are different. It is clear from FIG. 5 that the turning angle α2 at the position E is larger than the turning angle α1 at the position C. Therefore, the left-side rearview mirror at the position E will rotate outwards by an angle larger than the outward rotating angle of the rearview mirror at the position C. The rearview mirror at the right side can be designed or selected to keep unmoved or rotate along with the left-side rearview mirror when the rearview mirror at the left side rotates in response to a left-turn operation of the vehicle.

Figure 6:
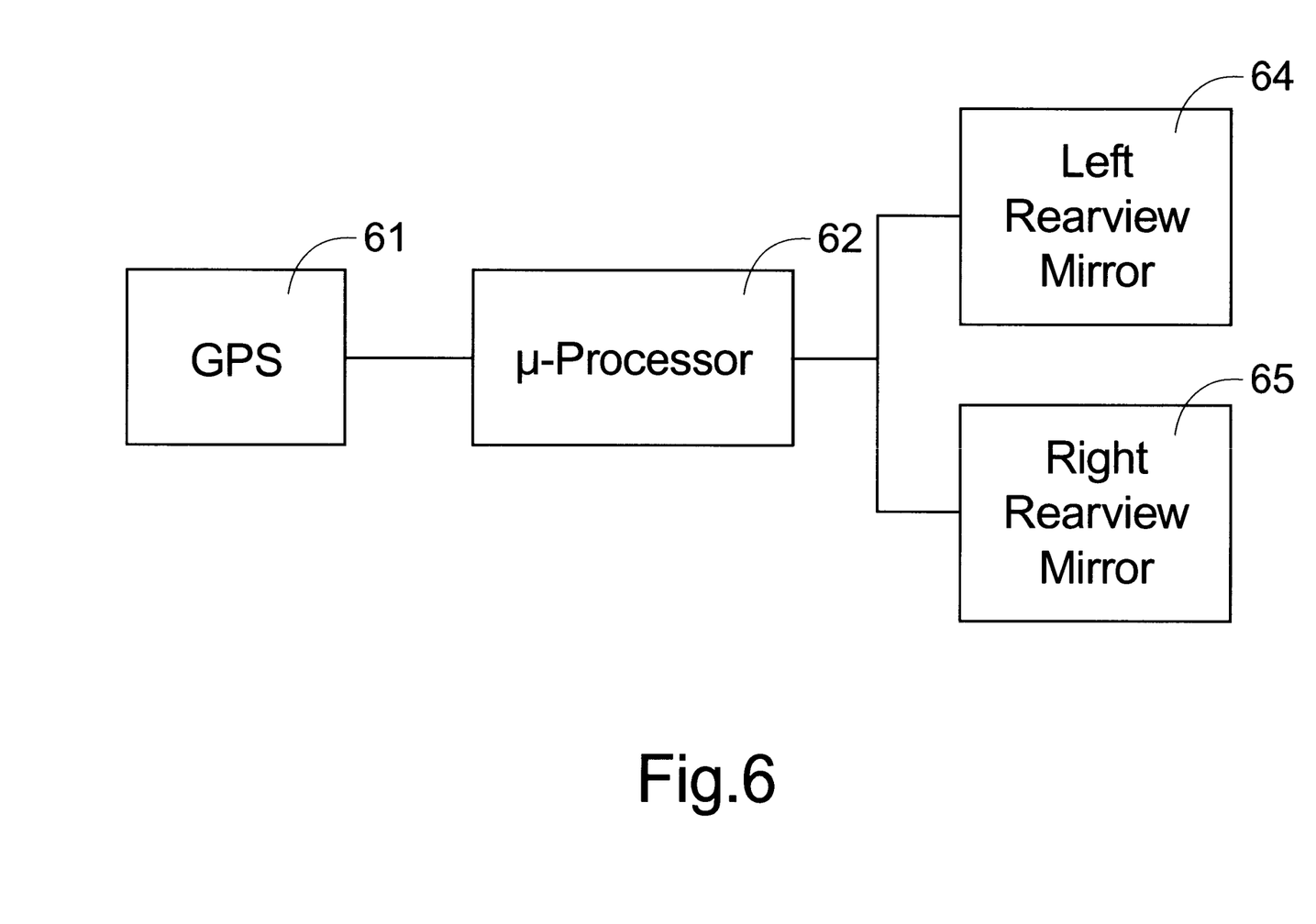
FIG. 6 is a circuit functional block diagram schematically showing a preferred embodiment of the control device for use with a global positioning system according to the present invention.

In order to achieve the purpose of automatically, and preferred dynamically, adjusting the view angle of the rearview mirror in response to a turning operation of the vehicle, as mentioned above, a control device is used to coordinate the rearview mirror and the GPS. FIG. 6 is a circuit functional block diagram schematically showing a preferred embodiment of the control device for use with a global positioning system (GPS) according to the present invention. The output of the GPS is transmitted to the microprocessor 62. In response to the output of the GPS 61 indicative of a turning operation, the microprocessor 62 outputs a control signal to rotate one or both of the left and right rearview mirrors 64 and 65 to a degree corresponding to the first level of direction change in a manner as mentioned above. After the vehicle completes the turning operation, the rearview mirrors are restored to their initial position.

The control device according to the present invention can be integrated into the computer system of the vehicle, and receives and transmits signals via a traditional communication network system or a controller area network bus (CAN-bus) system of a vehicle. Alternatively, it can be a control module added to an existent computer system of the vehicle especially via a CAN-bus system. A CAN-bus system is a communication standard for vehicles, which has been established since 1990 to communicate local computers with one another. Due to the arrangement of local computers or control modules, the numerous and complicated cables of various equipment of the vehicle are localized and simplified, and all the signals are transmitted among computers or control modules via the CAN-bus system. Consequently, the overall length and weight of the cables are significantly reduced.

Figure 7:
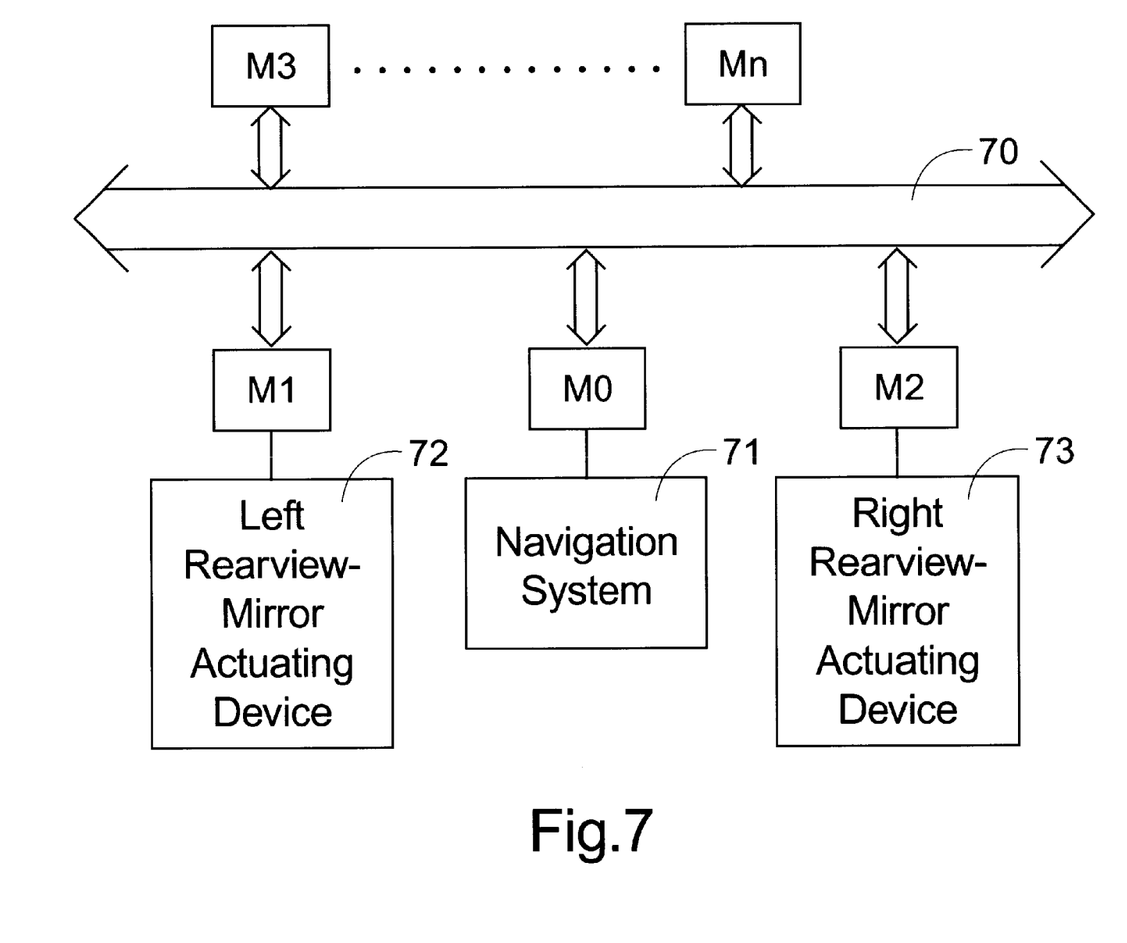
FIG. 7 is a schematic diagram showing the transmission of signals between a control device according to the present invention and rearview mirrors to be manipulated via a CAN-bus system.

FIG. 7 schematically shows the transmission of signals between a control device according to the present invention and rearview mirrors to be manipulated via a CAN-bus system. The present control module M0 is electrically connected between the CAN bus 70 and a navigation system 71. The control module M0 receives the output of a navigation system 71 such as an electronic compass or GPS, and transmits out a digital encoding signal to the CAN bus 70 to inform of a turning operation of the vehicle. Meanwhile, all the local computers or control modules M1 . . . Mn can acquire the information via the CAN bus. The digital encoding signal includes an ID code and a command code. The ID code directs to one or both of the control modules M1 and M2, so it is only the relevant control module(s) will respond to the digital encoding signal. The command code corresponds to a message for triggering the relevant rearview-mirror actuating device(s) 72 and/or 73, e.g. motor(s), to rotate the left and/or right rearview mirror(s).

It is to be noted that the control device according to the present invention is used for adjusting the view angle of the rearview mirror in response to the output of the navigation system. The control device can also used to move the exterior CCD cameras that become basic equipment in luxury cars in response to the output of the navigation system.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for automatically adjusting a view angle of a monitoring device of a turning vehicle, comprising steps of:
   receiving an output of an electronic compass;
   comparing said output of said electronic compass with a preset value;
   determining a turning level of said vehicle according to the comparing result of said output of said electronic compass with said preset value; and
   triggering said monitoring device to move according to said turning level of said vehicle.

2. The control method according to claim 1 said monitoring device is triggered to move to an extent corresponding to said turning level.

3. The control method according to claim 1 wherein said receiving, comparing and triggering steps are repeated to dynamically adjust a view angle of said monitoring device of said vehicle.

4. The control method according to claim 3 further comprising a step of counting a time period, wherein said time period is accumulatively counted when said turning level is kept to be zero, and said time period is counted over whenever said turning level is determined to be non-zero.

5. The control method according to claim 4 wherein said output of said electronic compass replaces for said preset value to serve as a new preset value, and said monitoring device is triggered to be restored to its initial position when said counted time period exceeds a predetermined value.

6. The control method according to claim 1 wherein said output of said electronic compass is indicative of one of sixteen direction zones, said preset value is indicative of one of said sixteen direction zones, and said turning level is determined to be zero when said output of said electronic compass and said preset value indicate the same direction zone.

7. The control method according to claim 6 wherein said turning level correlates to an angle between said direction zones indicated by said output of said electronic compass and said preset value.

8. The control method according to claim 1 wherein said monitoring device is an exterior rearview mirror.

9. The control method according to claim 1 wherein said monitoring device is a charge-coupled device (CCD) camera.

10. A control device for automatically adjusting a view angle of a monitoring device of a turning vehicle, comprising a microprocessor which repetitively receives an output of an electronic compass, determines a turning level of said vehicle according to said output of said electronic compass, performs a timing operation to accumulatively count a time period when said turning level is determined to be zero, counts over said time period when said turning level is determined to be non-zero, and triggers said monitoring device to move according to said turning level of said vehicle.

11. The control device according to claim 10 wherein said monitoring device is triggered to move to an extent corresponding to said turning level.

12. The control device according to claim 10 wherein said turning level of said vehicle is determined by comparing said output of said electronic compass with a preset value, and said microprocessor has said output of said electronic compass replace for said preset value to serve as a new preset value, and triggers said monitoring device to be restored to its initial position when said counted time period exceeds a predetermined value.

13. The control device according to claim 10 wherein said monitoring device includes an exterior rearview mirror.

14. The control device according to claim 10 wherein said monitoring device includes a charge-coupled device (CCD) camera.

15. A control device for automatically adjusting a view angle of a monitoring device of a turning vehicle, comprising a microprocessor electrically connected to a global positioning system (GPS) and a controller area network (CAN) bus, said microprocessor receiving an output of said GPS, and sending out a digital encoding signal to an actuating device via said CAN bus to trigger said actuating device to rotate said monitoring device when said output of said GPS indicates that said vehicle arrives at a predetermined turning position.

16. A control device for automatically adjusting a view angle of a monitoring device of a turning vehicle, comprising a microprocessor electrically connected to an electronic compass and a controller area network (CAN) bus, said microprocessor receiving an output of said electronic compass, and sending out a digital encoding signal to an actuating device via said CAN bus to trigger said actuating device to rotate said monitoring device when said output of said electronic compass indicates that said vehicle is heading a direction different from a preset direction.

17. The control device according to claim 16 further comprising a timer electrically connected to said microprocessor for counting a time period, wherein said direction that said vehicle is heading replaces for said preset direction to serve as a new preset direction when said counted time period exceeds a predetermined value.

18. A control device for automatically adjusting a view angle of a monitoring device of a turning vehicle, comprising:
   a microprocessor repetitively receiving an output of an electronic compass, and determining a turning level of said vehicle according to said output of said electronic compass, and triggers said monitoring device to move according to said turning level of said vehicle; and a timer electrically connected to said microprocessor for counting a time period, wherein said time period is accumulatively counted whenever said microprocessor determines said turning level is zero, and said time period is counted over whenever said microprocessor determines said turning level is non-zero.

19. The control device according to claim 18 wherein said turning operation of said vehicle is determined by comparing said output of said electronic compass with a preset value, and said microprocessor has said output of said electronic compass replace for said preset value to serve as a new preset value, and triggers said monitoring device to be restored to its initial position when said counted time period exceeds a predetermined value.

* * * * *